(12) United States Patent
Zhao (10) Patent No.: US 10,718,915 B2
(45) Date of Patent: Jul. 21, 2020

(54) COMPACT AND LOW COST BEAM LAUNCHER USING PLANAR LIGHTWAVE CIRCUIT

(71) Applicant: California Institute of Technology, Pasadena, CA (US)

(72) Inventor: Feng Zhao, Arcadia, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/008,317

(22) Filed: Jun. 14, 2018

(65) Prior Publication Data

US 2018/0364431 A1    Dec. 20, 2018

Related U.S. Application Data

(60) Provisional application No. 62/519,723, filed on Jun. 14, 2017.

(51) Int. Cl.
*G02B 6/125* (2006.01)
*G01B 9/02* (2006.01)
(Continued)

(52) U.S. Cl.
CPC ......... *G02B 6/4287* (2013.01); *G01B 9/0207* (2013.01); *G01B 9/02015* (2013.01);
(Continued)

(58) Field of Classification Search
CPC ............ G01B 9/02027; G01B 9/02051; G01B 9/0207; G01B 2290/60; G02B 6/125;
(Continued)

(56) References Cited

U.S. PATENT DOCUMENTS 4,941,744 A * 7/1990 Yokokura .......... G01B 9/02028
356/482
5,396,328 A * 3/1995 Jestel .................... G01D 5/266
356/482
(Continued)

OTHER PUBLICATIONS

"Range-Gated Metrology With Compact Optical Head", NASA Tech Briefs, Jul. 2008, pp. 31-32, https://ntrs.nasa.gov/search.jsp?R=20090011290 2019-03-15T20:0324+00:00Z.
(Continued)

*Primary Examiner* — Robert Tavlykaev
(74) *Attorney, Agent, or Firm* — Gates & Cooper LLP (57) ABSTRACT

A photonic integrated circuit including a beam launching waveguide, a local oscillator waveguide, a target interferometer, and a reference interferometer all integrated on a chip. The beam launching waveguide transmits target electromagnetic radiation off the chip and receives a retroreflection of the target electromagnetic radiation from a target off the chip. The target interferometer interferes the retroreflection with a local oscillator field transmitted from the local oscillator waveguide so as to form a target interference signal. The reference interferometer interferes a portion of the target electromagnetic radiation that does not leave the chip with the local oscillator field transmitted from the local oscillator waveguide to form a reference interference signal. The difference between the reference interference signal and the target interference signal is used to measure a distance to the target from the chip.

20 Claims, 10 Drawing Sheets

(51) Int. Cl.
*G02B 6/42* (2006.01)
*G02B 6/12* (2006.01)
*G01C 3/00* (2006.01)

(52) U.S. Cl.
CPC ...... *G01B 9/02051* (2013.01); *G01B 2290/60* (2013.01); *G01C 3/00* (2013.01); *G02B 6/125* (2013.01); *G02B 2006/12138* (2013.01)

(58) Field of Classification Search
CPC ........ G02B 6/4287; G02B 2006/12138; G01C 3/00; G01C 19/723
USPC .............................................. 385/12, 14, 42
See application file for complete search history.

(56) References Cited

U.S. PATENT DOCUMENTS

| | | | | |
|---|---|---|---|---|
| 5,541,730 | A * | 7/1996 | Chaney | G01B 9/02004 356/482 |
| 5,784,161 | A * | 7/1998 | Bechstein | G01J 9/04 356/487 |
| 6,778,278 | B2 * | 8/2004 | Ahmadvand | G02B 6/29352 356/477 |
| 6,947,621 | B2 * | 9/2005 | Bell, Jr. | G01D 5/35303 385/147 |
| 7,003,186 | B2 | 2/2006 | Bell, Jr. et al. | |
| 7,764,384 | B1 * | 7/2010 | Zhao | G01B 9/02004 356/486 |
| 8,543,350 | B2 * | 9/2013 | Hilby | G01V 7/14 324/244 |
| 9,441,614 | B2 * | 9/2016 | Olesen | F03D 7/022 |
| 2003/0023153 | A1 * | 1/2003 | Izatt | A61B 5/0066 600/407 |
| 2003/0169956 | A1 * | 9/2003 | Lange | G01B 11/16 385/12 |
| 2005/0168752 | A1 * | 8/2005 | Bell, Jr. | G01D 5/35303 356/482 |
| 2010/0014802 | A1 * | 1/2010 | Chapman | G02B 6/125 385/11 |
| 2010/0303476 | A1 * | 12/2010 | Barton | H04B 10/505 398/212 |
| 2011/0032529 | A1 * | 2/2011 | Wan | G01J 3/02 356/451 |
| 2014/0202786 | A1 * | 7/2014 | Beal | G01V 1/18 181/122 |
| 2014/0376000 | A1 * | 12/2014 | Swanson | G01B 9/02091 356/479 |
| 2015/0198433 | A1 * | 7/2015 | Saint Clair | G01B 9/02027 356/72 |

OTHER PUBLICATIONS

Takahashi, H., "High performance planar lightwave circuit devices for large capacity transmission", Optics Express, Dec. 12, 2011, pp. 1-8, vol. 19, No. 26, http://www.opticsinfobase.org/oe/fulltext.cfm?uri=oe-19-26-B173&id=224466.

* cited by examiner

COMPACT AND LOW COST BEAM LAUNCHER USING PLANAR LIGHTWAVE CIRCUIT

CROSS REFERENCE TO RELATED APPLICATIONS

This application claims the benefit under 35 U.S.C. Section 119(e) of and commonly-assigned U.S. Provisional Patent Application Ser. No. 62/519,723, filed on Jun. 14, 2017, by Feng Zhao, entitled "COMPACT AND LOW COST BEAM LAUNCHER USING PLANAR LIGHTWAVE CIRCUIT", (CIT-7751-P); which application is incorporated by reference herein.

STATEMENT REGARDING FEDERALLY SPONSORED RESEARCH AND DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND OF THE INVENTION

1. Field of the Invention

The present invention relates to a metrology system.

2. Description of the Related Art (Note: This application references a number of different publications as indicated throughout the specification by one or more reference numbers in brackets, e.g., [x]. A list of these different publications ordered according to these reference numbers can be found below in the section entitled "References." Each of these publications is incorporated by reference herein.)

Laser metrology systems are recognized as an enabling technology for large spaceborne structures ranging from optical platforms to radio frequency (RF) antennas. However, the benefits of laser metrology have been shadowed by the system's complexity and cost. High speed modulators and signal processors are needed for Range-Gate Metrology (RGM) [1] and bulky beam launchers are needed for traditional metrology developed for Space Interferometry Mission (SIM).

SUMMARY OF THE INVENTION

The present disclosure describes a photonic integrated circuit comprising a first coupler; a beam launching waveguide coupled to the first coupler; a target interferometer including a target waveguide, a first local oscillator (LO) waveguide, a second coupler coupling the target waveguide and the first LO waveguide; a reference interferometer including a reference waveguide, a second local oscillator (LO) waveguide, and a third coupler coupling the reference waveguide and the second LO waveguide; and a fourth coupler coupled to the second LO waveguide and the first LO waveguide.

The first coupler splits electromagnetic radiation into target electromagnetic radiation, transmitted to the beam launching waveguide, and reference electromagnetic radiation transmitted to the reference waveguide.

The fourth coupler splits LO electromagnetic radiation into first LO electromagnetic radiation transmitted to the first LO waveguide and second LO electromagnetic radiation transmitted to the second LO waveguide.

The beam launching waveguide transmits the target electromagnetic radiation off the circuit, receives retroreflected electromagnetic radiation comprising a retroreflection of the target electromagnetic radiation from a target off the circuit, and transmits the retroreflected electromagnetic radiation to the target waveguide.

The target waveguide transmits a retroreflected field of the retroreflected electromagnetic radiation to the second coupler and the first LO waveguide transmits an LO field of the first LO electromagnetic radiation to the second coupler. The retroreflected field interferes with the LO field in the second coupler so as to form a target interference signal.

The reference waveguide transmits a reference field of the reference electromagnetic radiation to the third coupler and the second LO waveguide transmits the LO field of the second LO electromagnetic radiation to the third coupler. The reference field interferes with the LO field in the third coupler so as to form reference interference signal.

A difference between the reference interference signal and the target interference signal is used to determine a distance or variations in a distance to the target relative to the photonic integrated circuit.

In one or more examples, the optical path lengths of the waveguides are selected so as to minimize sensitivity of the difference to thermal variations.

In one or more examples, an optical system is electromagnetically coupled to the circuit so as to form a metrology system. The optical system collimates the target electromagnetic radiation transmitted off the circuit and transmits the target electromagnetic radiation to the target. Optical path lengths of the waveguides are selected so as to at least partially compensate for changes in optical path length through the optical system due to thermal variations.

In one or more examples, optical path lengths of the waveguides are selected so that the sum of:

(1) the derivatives of optical path lengths through each of the waveguides, with respect to temperature, and (2) the derivative of optical path length through the optical system, with respect to temperature.

is 0.1 or less.

In one or more examples, a total optical path length through all the waveguides is in a range of −4 to −10 mm.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Technical Description

Example Metrology System

Figure 1A:
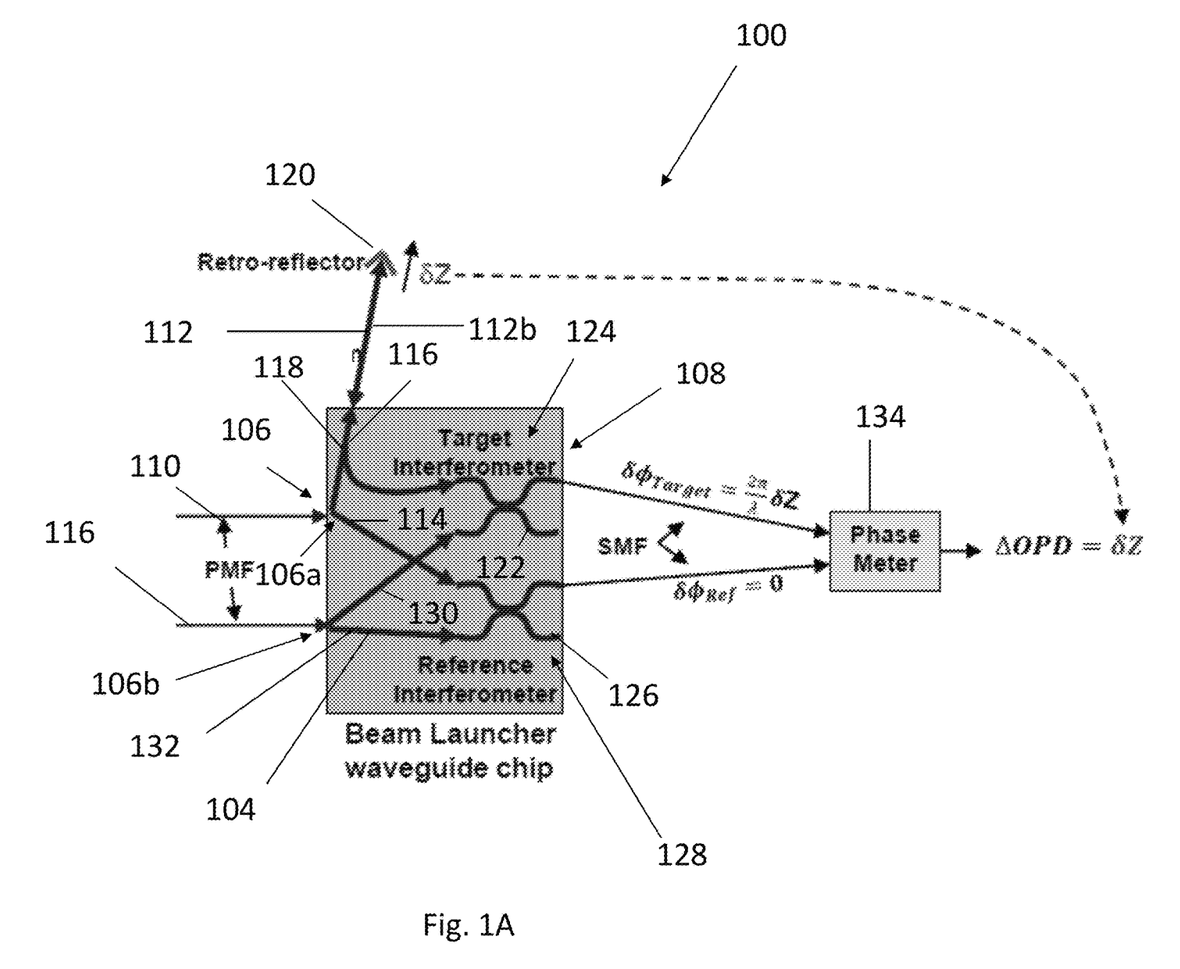
FIG. 1A is a schematic diagram illustrating a metrology system according to one or more embodiments, illustrating a photonic integrated circuit coupled to a corner cube retroreflector.

FIG. 1A is a schematic diagram illustrating a metrology system 100 comprising a beam launcher implemented in a planar lightwave circuit (PLC) 102.

The PLC circuit 102 comprises a plurality of waveguides 104 and couplers 106 formed on a chip 108. The couplers 106 include a first coupler 106a splitting a measurement beam 110 into a motion sensing beam 112 and a reference beam 114; and a second coupler 106b splitting a local oscillator (LO) beam 116 into a first LO beam and a second LO beam. The waveguides 104 include a beam launching waveguide 118 launching the motion sensing beam 112 off the chip 108 towards a retroreflector 120 and receiving the reflection 112b of the motion sensing beam 112 from the retroreflector 120. The waveguides 104 further include waveguides 122 disposed so as to form a target interferometer 124; and waveguides 126 disposed so as to form a reference interferometer 128. The waveguides further include first LO waveguide 130 transmitting the first LO beam to the target interferometer 124 and second LO waveguide 132 transmitting the second LO beam to the reference interferometer.

Target interferometer 124 interferes the reflection 112b of the motion sensing beam 110 (received from the beam launching waveguide) with the first LO beam so as to form an interference signal having a phase $\Delta\Phi_{Target}=(2\pi/\lambda)\delta Z$, where $\lambda$ is the wavelength of the measurement beam 110 and $\delta Z$ is the change in distance to the retroreflector 120 due to motion of the retroreflector.

Reference interferometer 128 interferes the reference beam 114 with the second LO beam so as to form an interference signal having a phase $\Delta\Phi_{Ref}$ (e.g., set as 0). A phase meter 134 measures the difference between $\Delta\Phi_{Target}$ with $\Delta\Phi_{Ref}$ and the difference is used to determine the change in optical path difference (OPD); OPD is in turn be used to determine $\delta Z$ (change in distance to retroreflector) caused by motion of the retroreflector 120.

In one or more examples, polarization maintaining fibers (PMF) can be used to transmit the measurement beam 110 and LO beam 116 to the chip 108 and single mode fibers (SMF) are used to transmit the interference signals to the phase meter 134.

Figure 1B:
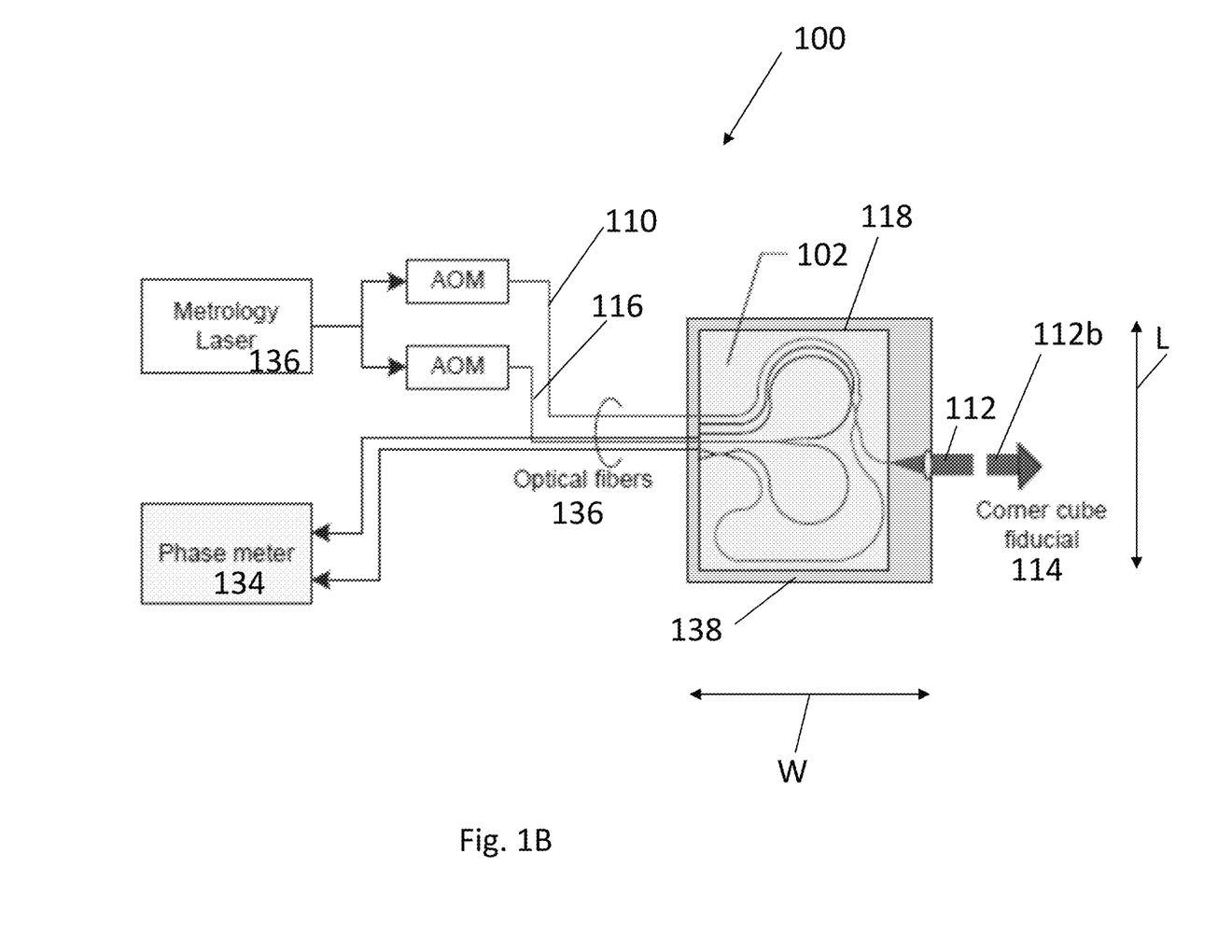
FIG. 1B is a schematic diagram illustrating the metrology system coupled to a laser, according to one or more embodiments.

FIG. 1B illustrates an example wherein electromagnetic radiation outputted from metrology laser 136 is split into the LO electromagnetic radiation 116 and the measurement beam 110. Acousto-optic modulators (AOM) are used to control frequency of the LO electromagnetic radiation 116 and measurement beam 110. Optical fibers 136 are used to feed the LO electromagnetic radiation 116 and measurement beam 110 into the circuit 102. In the example of FIG. 1B, motion sensing beam 112 is launched as a freespace laser beam off the circuit 100 to the fiducial 114 (retroreflector 120 comprising a corner cube). The motion sensing beam 112 can be incident at the center of the corner cube where the three planes of the corner cube meet.

Example dimensions for the chip 108 include, but are not limited to, a chip having a length L and width W of 20 millimeters or less. In one or more embodiments, the housing 138 for the chip (beam launcher package) has dimensions of 25 mm×25×5 mm, e.g., similar to that of rangegated metrology beam launcher head while offering advantages of not requiring high speed electronics and custom modulators.

Example PLC

Figure 2:
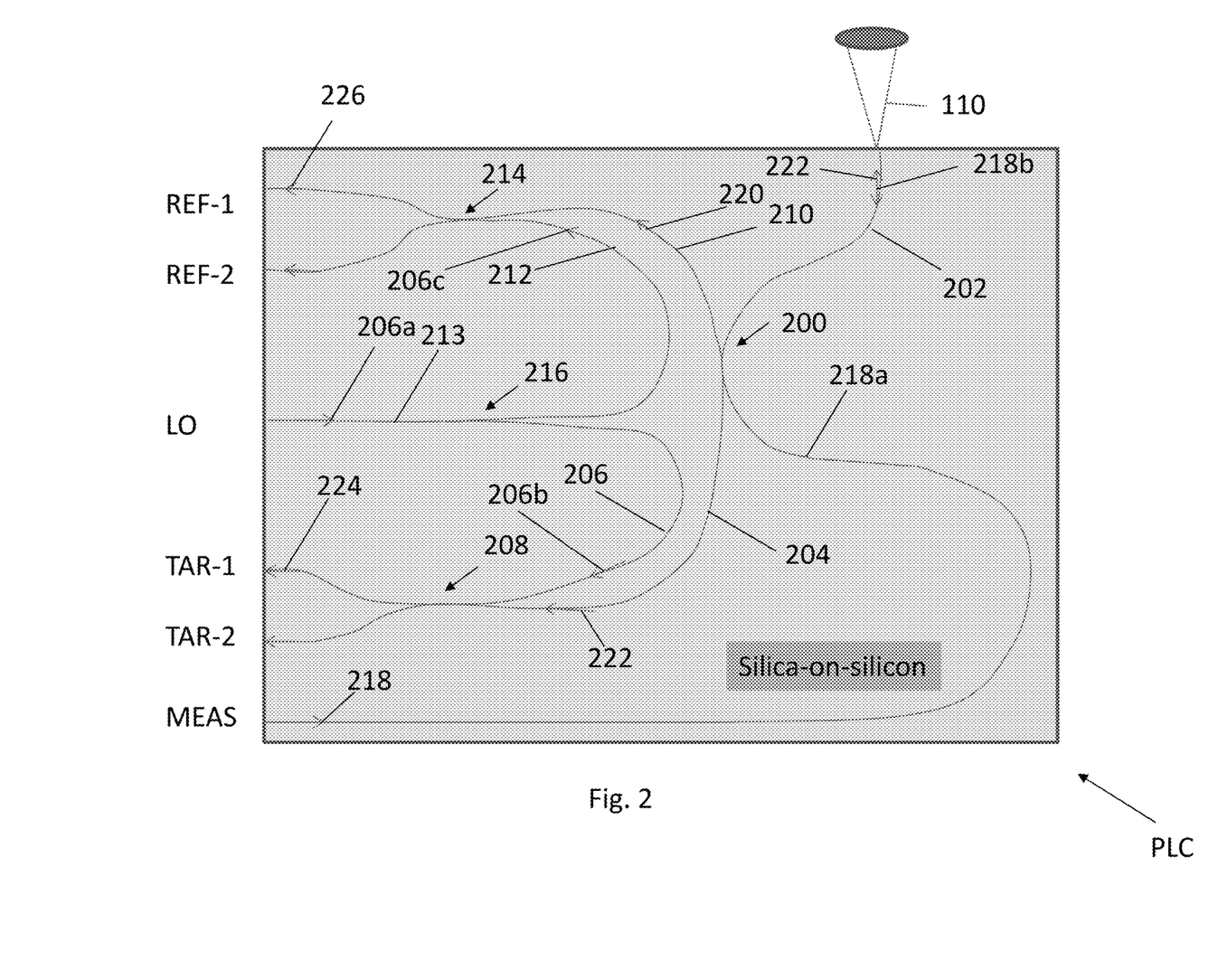
FIG. 2 is a schematic diagram of a photonic integrated circuit according to one or more embodiments.

FIG. 2 illustrates a photonic integrated circuit or photonic lightwave circuit (PLC) according to one or more examples. As illustrated in FIG. 2, the PLC comprises a first coupler 200; a beam launching waveguide 202 coupled to the first coupler 200; a target waveguide 204; a first LO waveguide 206; a second coupler 208 (e.g., 2×2 coupler) coupling the target waveguide 204 and the first LO waveguide 206; a reference waveguide 210; a second LO waveguide 212; a third coupler 214 (e.g., 2×2 coupler) coupling the reference waveguide 210 and a second LO waveguide 212; and a fourth coupler 216 (e.g., 1×2 coupler) splitting LO electromagnetic radiation 206a in an LO waveguide 213 into first LO electromagnetic radiation 206b transmitted to the first LO waveguide 206 and second LO electromagnetic radiation 206c transmitted to the second LO waveguide 212. The LO electromagnetic radiation 206a is inputted into LO waveguide 213 from optical fiber 136 through an input LO.

The first coupler 200 (e.g., 2×2 coupler) splits electromagnetic radiation 218a in input waveguide 219 into target electromagnetic radiation 218b transmitted to the beam launching waveguide 202 and reference electromagnetic radiation 220 transmitted to the reference waveguide 210. The electromagnetic radiation 218a is inputted from optical fiber 136 into the beam launching waveguide 202 through an input MEAS.

The beam launching waveguide 202 transmits the target electromagnetic radiation 218b off the chip 108, receives retroreflected electromagnetic radiation 222 comprising a retroreflection of the target electromagnetic radiation 218b from a target (fiducial 114) off the chip 108, and transmits the retroreflected electromagnetic radiation 222 to the target waveguide 204.

The target waveguide 204 transmits a retroreflected field of the retroreflected electromagnetic radiation 222 to the second coupler 208 and the first LO waveguide 206 transmits an LO field of the first LO electromagnetic radiation 206b to the second coupler 208, wherein the retroreflected field interferes with an LO field in the second coupler 208 so as to form a target interference signal 224.

The reference waveguide 210 transmits a reference field of the reference electromagnetic radiation 220 to the third coupler 214 and the second LO waveguide 212 transmits an LO field of the second LO electromagnetic radiation 206c to the third coupler 214, wherein the reference field interferes with the LO field in the third coupler 214 so as to form reference interference signal 226. The LO interferes with the portion of the measurement beam 110 that does not leave the chip 108 and may contain information due to path length variations on the chip up to the point where the third coupler is located.

A difference between the reference interference signal 226 and the target interference signal 224 (e.g., difference=target interference signal minus reference interference signal) is used to determine a distance to the target from the photonic integrated circuit (PLC). In one or more examples, the target interference signal may represent path length information between the chip 108 and the corner cube and the reference interference signal subtracted out represents the path length information in the chip or due to the laser beams 110, 116 being inputted onto the chip.

Example Operation

Figure 3:
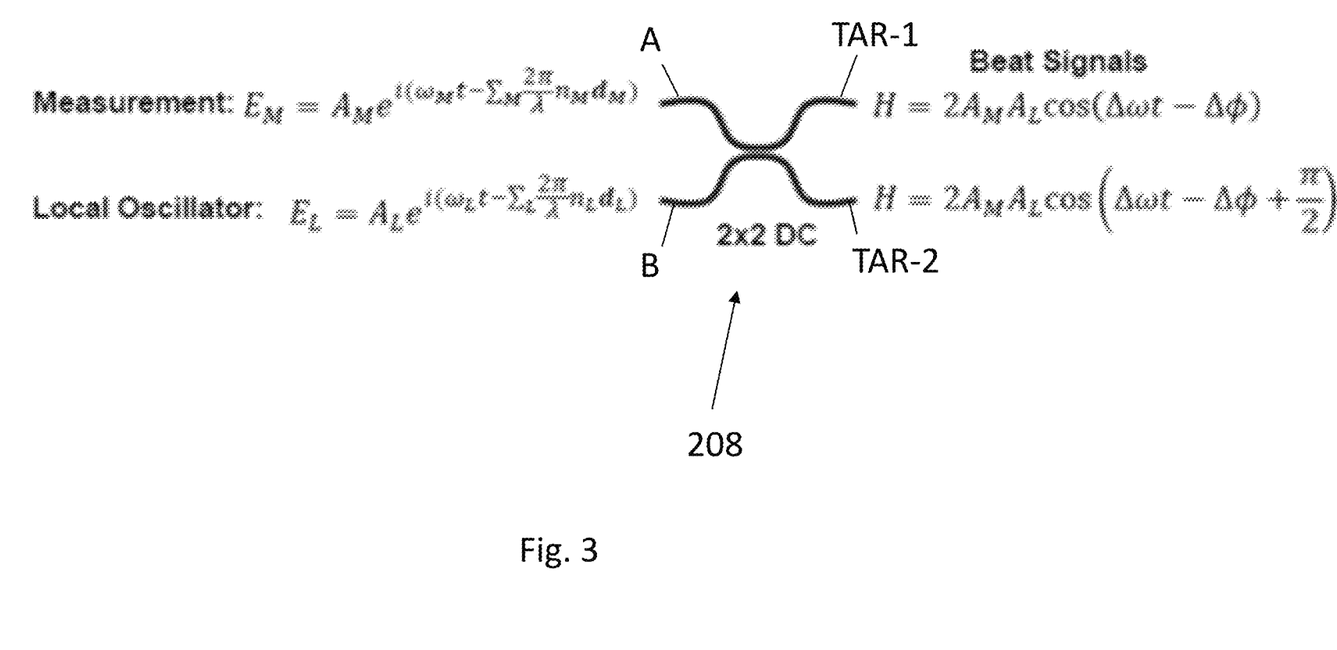
FIG. 3 is a schematic diagram of the target interferometer, according to one or more embodiments.

FIGS. 2 and 3 illustrate an example wherein the second coupler 208 and third coupler 214 each include a first input A, a second input B, a first output TAR-1, REF-1 and a second output TAR-2, REF-2.

In one or more examples, the retroreflected electromagnetic radiation 222 having an electric field $$E_M = A_M e^{i(\omega_M t - \Sigma_M \frac{2\pi}{\lambda} n_M d_M)} \quad (1)$$

is inputted to the first input A from the target waveguide. The LO electromagnetic radiation 206b having a field $$E_L = A_L e^{i(\omega_L t - \Sigma_L \frac{2\pi}{\lambda} n_L d_L)} \quad (2)$$

is inputted from the first LO waveguide to the second input B. The superposition/interference of $E_M$ and $E_L$ in the second coupler 208 forms two beat signals (heterodyne ac signal):

$$H = 2A_{MS} A_L \cos(\Delta\omega t - \Delta\varphi) \quad (3)$$
$$H = 2A_{MS} A_L \cos\left(\Delta\omega t - \Delta\varphi + \frac{\pi}{2}\right)$$

which are outputted to the first output TAR-1 and second output TAR-2 respectively. Each of the outputs may represent an interference fringe (bright and dark fringes, e.g., one reflected, one transmitted) and may be 180 degrees out phase with each other. The brightness of the fringe may depend on the path length difference being measured (distance to fiducial 114). One or both of the outputs may be used to determine the distance to fiducial 114.

The optical path difference (OPD) is proportional to the beat signal phase $\Delta\Phi$:

$$OPD = \frac{\lambda}{2\pi} \Delta\phi = \left( \sum_M n_M d_M - \sum_L n_L d_L \right). \quad (4)$$

E=E field
A=Amplitude of E field
n=index of refraction
λ=wavelength
$\Delta\omega = \omega_M - \omega_L$
ω=angular frequency
d=physical path length H=Heterodyne beat signal
M=Measurement path
L=Local Oscillator path
OPD=Optical Path Difference
OPD is path difference between the two arms of the interferometer.

Similarly, the reference electromagnetic radiation having an electric field Ea is inputted to the first input A of the third coupler 214 (Subscript R replacing subscript M in equations 1, 3, and 4 above), the second LO electromagnetic radiation having an electric field $E_L$ is inputted from the second LO waveguide to the second input B of the third coupler 214, and superposition/interference of $E_R$ and $E_L$ in the third coupler 214 forms two beat signals in accordance with equation (4).

A difference between the reference interference signal at either one of two outputs REF-1 or REF-2 of the third coupler 214 and the target interference signal (at either one of the two outputs TAR-1 or TAR-2 of the second coupler 208) is used to determine a distance to the target or fiducial 114 from the photonic lightwave circuit (PLC).

All or one or more of the chip to free-space interfaces are angle-polished to reduce return loss. The free space beam 112 comprising target electromagnetic radiation 218b may be collimated by lens 228 before transmission to the fiducial 114.

In one or more examples, the waveguides and couplers are fabricated in a silica on silicon chip [2].

Example Metrology System Housing and External Optics

Figure 4A:
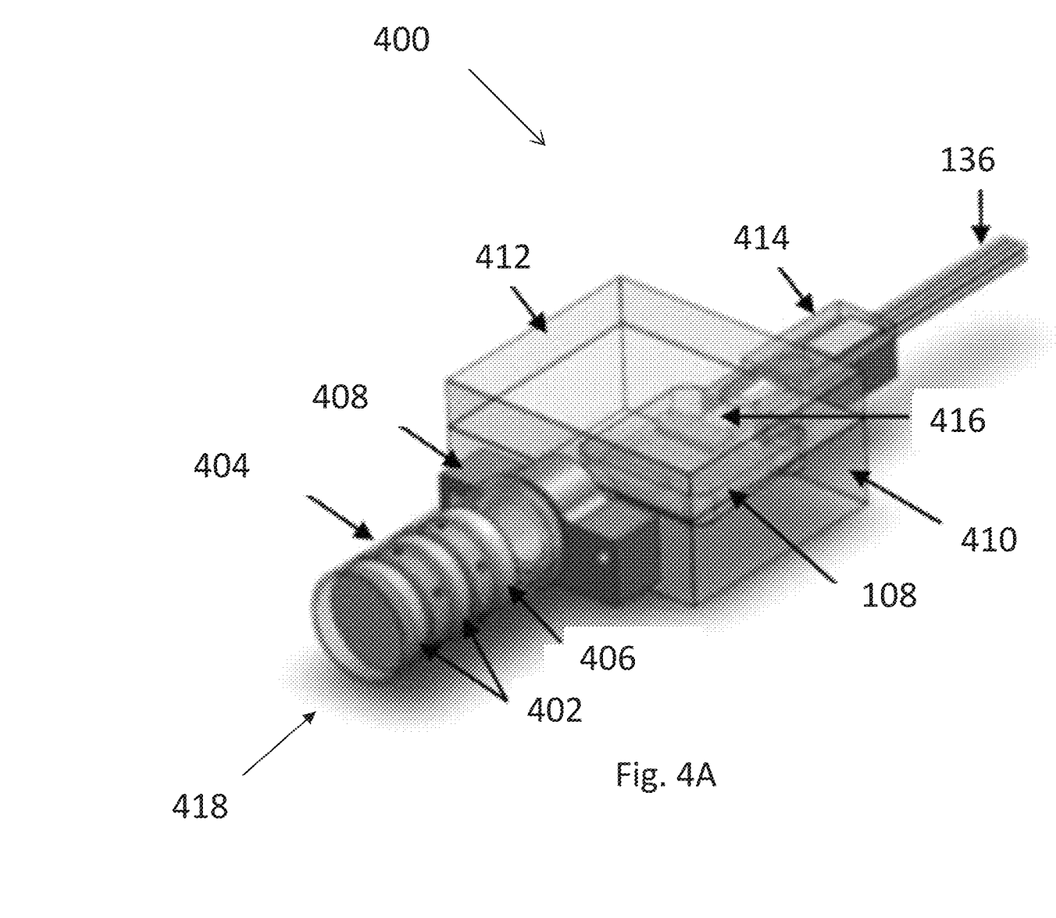
FIG. 4A is a diagram of a package including the PLC chip and the external optics, according to one or more embodiments.
Figure 4B:
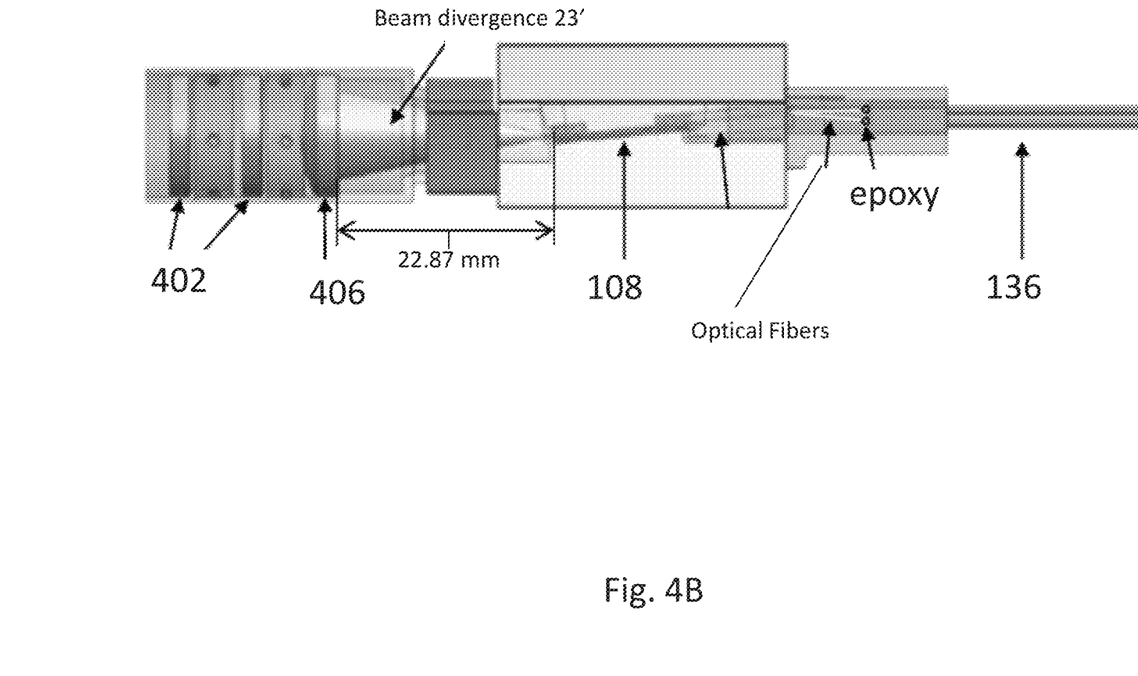
FIG. 4B is a side view of the package in FIG. 4A.

FIGS. 4A and 4B illustrate the PLC incorporated in a metrology system 400, comprising Risley prisms 402 mounted in mounting rings 404, a collimating lens 406 housed in a lens alignment frame 408 (e.g., fabricated from invar), PLC chip 108, housing 410 (e.g., glass) for the chip 108, lid 412 (e.g., glass) for housing 410; fiber fanout block and support 414 (e.g., fabricated from invar), fiber array 416, and optical fibers 136.

Target and LO radiation are inputted to the chip from first and second optical fibers, and interference signals REF-1, REF-2, TAR-1, TAR-2 are outputted from the chip through third, fourth, fifth and sixth optical fibers. Target electromagnetic radiation launched from the chip is collimated by the lens 406 and transmitted to target 114 through the Risley prisms 402. Retroreflected electromagnetic radiation 112b reflected from the target is collected by the Risley prisms 402 and lens 406 and transmitted back to the chip 108 as described above.

Figure 4C:
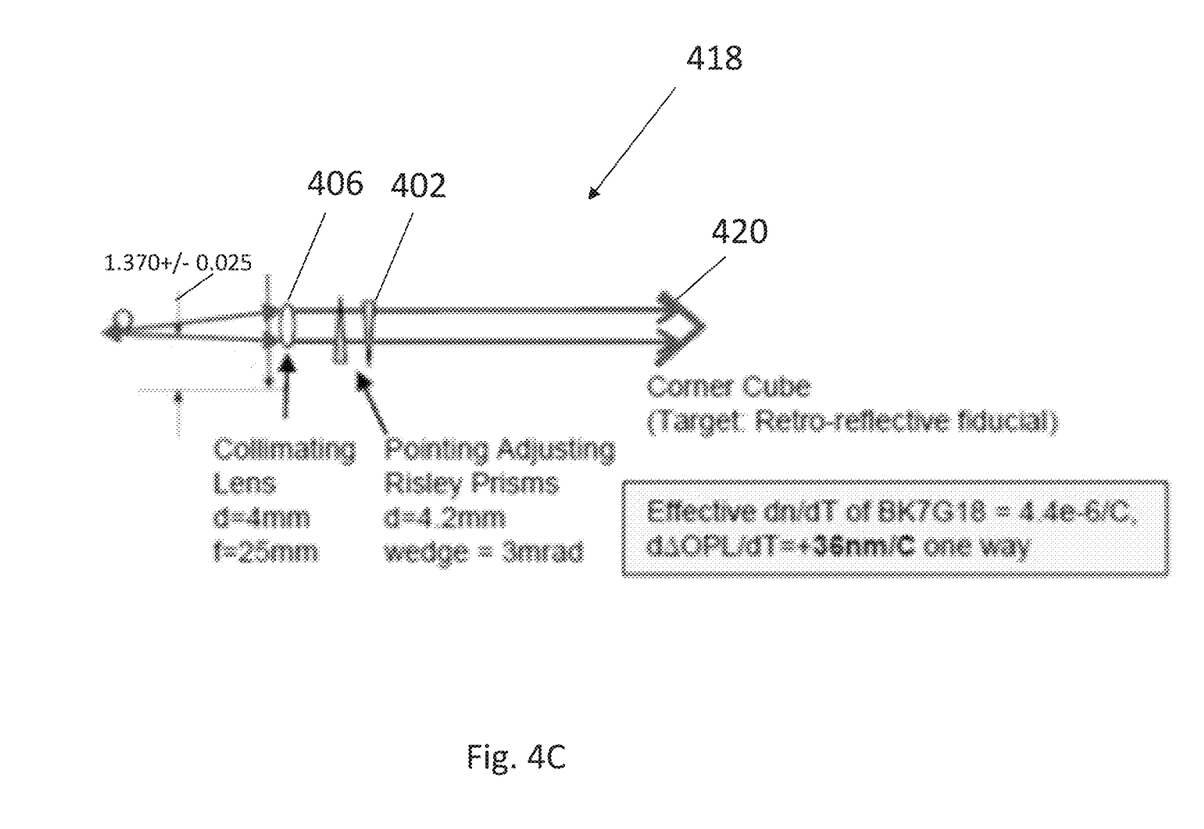
FIG. 4C illustrates external optics, according to one or more embodiments.

In the example of FIG. 4B:
Risley prisms 402 have an outer diameter for 12.5 mm, a wedge of 1 mrad, and are fabricated from BK7-G18 glass.
Collimating lens 406 has an outer diameter of 12.5 mm and is fabricated from BK7-G18 glass.
Optical fibers 136 transmit the measurement beam 110 having a wavelength of 900 micrometers.
Optical fibers 136 are secured to support 414 using epoxy.
FIG. 4C illustrates an example wherein the external optics 418 used to transmit the measurement beam 110 or target electromagnetic radiation 218b to fiducial 114 or retroreflector 120 comprises a collimating lens 406 having a diameter of 4 mm and a focal length of 25 mm, Risley prisms 402 having a diameter of 4.2 mm and a wedge of 3 mrad, and the retroreflector 120 comprising a corner cube 420. The Risley prisms and collimating lens are fabricated from BK7G18 glass.

Example: Thermal Compensation

The waveguides 118 forming the lightwave circuit(s) PLC can be routed to compensate thermal sensitivities. In one or more examples, the optical path length (OPL) of the waveguides in the circuit 102 (e.g., the waveguide lengths or paths in the PLC) are selected to compensate the change in optical path length (dOPL) as a function of temperature (T) due to the external optics (OPL is refractive index multiplied by physical length of the optical path).

The following equations are used to design the lengths of the waveguides and determine the thermal sensitivity of the metrology system and measurement error due to thermal variations introduced by various components in the metrology system:

dOPL/dT=L(dn/dT+nα) for waveguides on the chip 108, where a is the coefficient of thermal expansion.

dOPL/dT=L(dn/dT+nα)−Lα=L(dn/dT+(n−1)α) for external optics 418.

For example, the optical system of FIG. 4C was analyzed using the above dOPL/dT equations and the effective change in refractive index with temperature (dn/dT) through the external optics 418 was found to be 36 nm/C (one way). In this example, the target and reference interferometers are designed to introduce a change in OPL (ΔOPL)=−6.5 mm to compensate the dOPL/dT of the external optics 418.

Further examples are shown in Table 1.

TABLE 1

|  | Unit | dL(fiducial)/dT (round trip) | Double Pass Sensitivity PLC (SiO2/Si) | Double Pass Sensitivity Lens (BK7-G18) | Prism (BK7-G18) | Single Pass Sensitivity Net temperature sensitivity (sum of all terms on the left) |
|---|---|---|---|---|---|---|
| n |  |  | 1.4495 | 1.5036 | 1.5036 |  |
| ∂n/∂T(T) | 1/C. |  | 8.36E−06 | 8.57E−07 | 8.57E−07 |  |
| ∂n/∂σ∂σ/dT | 1/C. |  | −1.72E−06 | NA | NA |  |
| ΔPL (path length) | mm |  | −6.00 | 8 | 8.56 |  |
| α (CTE) | 1/C. |  | 2.60E−06 | 7.00E−06 | 7.00E−06 |  |
| dOPL/dT | nm/C. | −10 | −62 | 35 | 38 | 0.1 |

Figure 5:
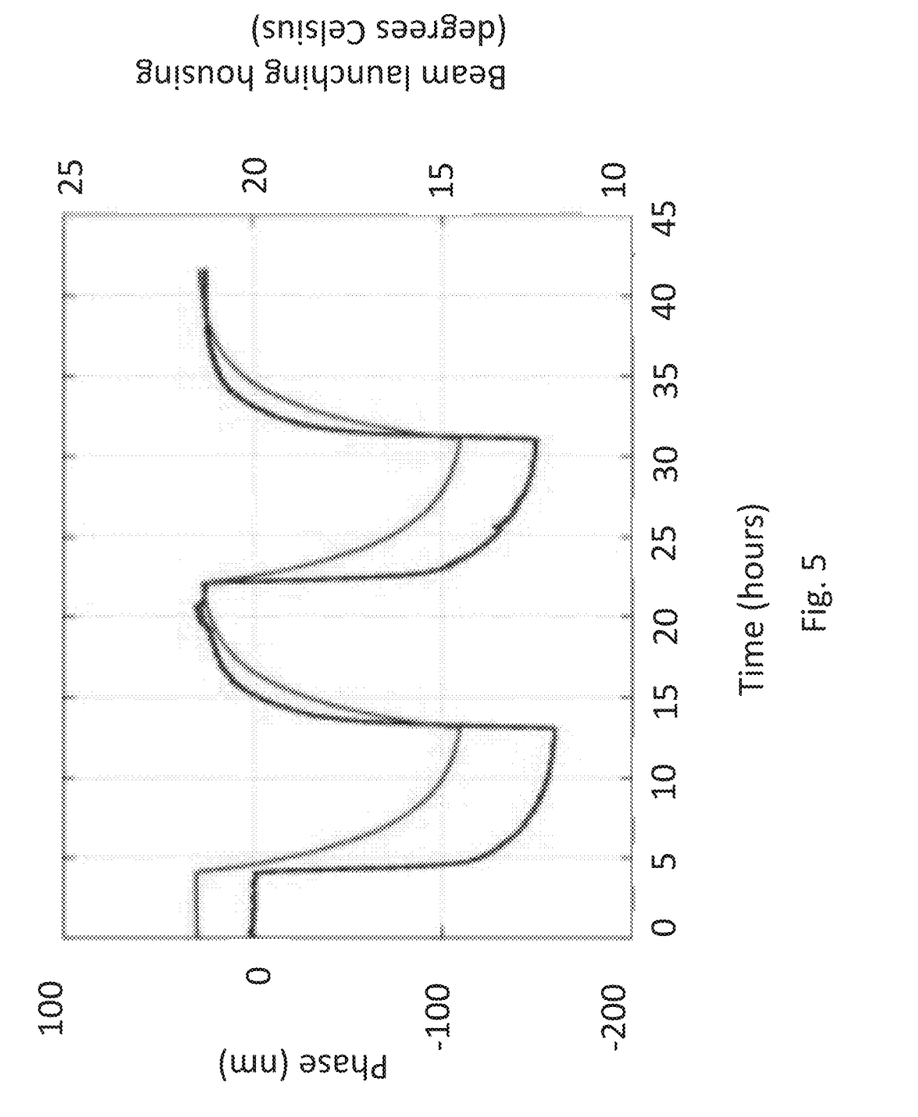
FIG. 5 plots phase (in nanometers, nm) as a function of time and temperature, according to one or more embodiments.

In one or more examples, the variation in phase due to temperature variations of the beam launcher (chip 108) and collimator (external optics 418) is designed to be under 27.5 nm (root mean square (RMS) for chip housing 138 temperature variations of +/−0.35° C. and a collimator temperature variation of +/−0.8° C. within 1.5 hours. FIG. 5 shows example phase variation for the system of FIG. 4A-4B as a function of time.

The paths in the PLC can be selected to minimize thermal sensitivity.

Example: Birefringence Effect on Phase Error

In one or more applications it may be desirable to reduce phase error due to birefringence of the waveguides on the chip and/or optical fibers.

Figure 6:
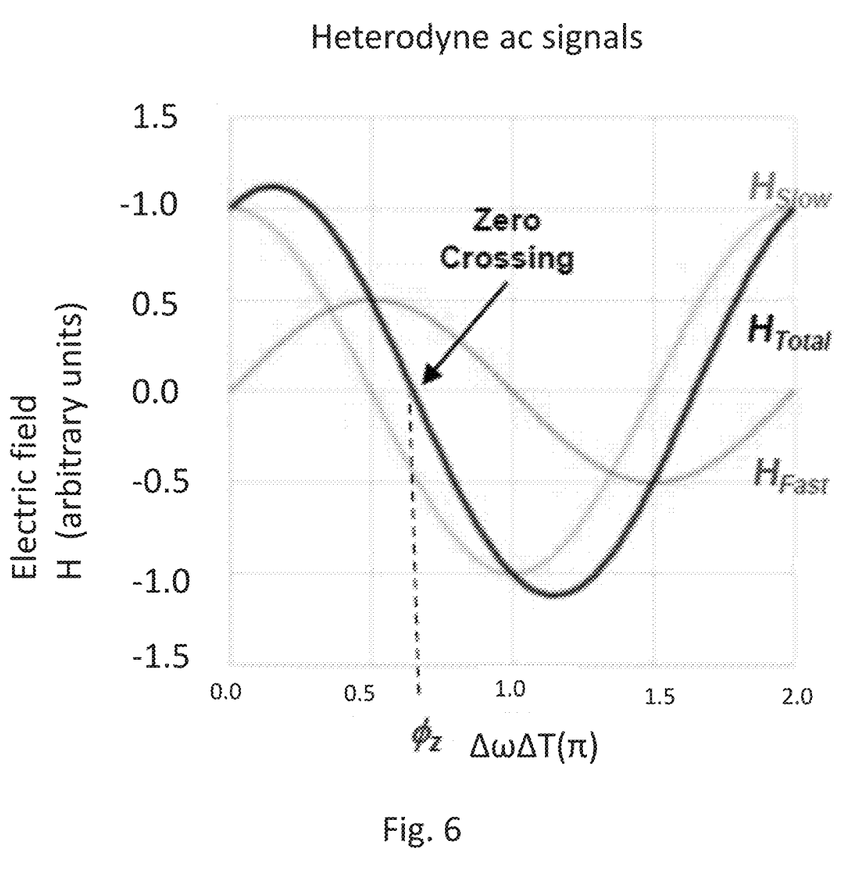
FIG. 6 plots alternating current (AC) heterodyne electric field outputted from the target interferometer when using birefringent waveguides, according to one or more embodiments.

In one or more such examples, $E_{M,R}$ and $E_L$ include terms for the fast polarization and the slow polarization so that the heterodyne beat signal of equation (3) includes two terms $$H_X = 2A_{MX}A_{LX}\cos(\Delta\omega t - \Delta\varphi_X) \; (H_{slow}, X = \text{slow } (S) \text{ polarization})$$

+

$$H_X = 2A_{MX}A_{LX}\cos(\Delta\omega t - \Delta\varphi_X) \; (H_{fast}, X = \text{fast } (F) \text{ polarization})$$

The total heterodyne signal is $$H_{Total}=H_{slow}+H_{fast}=2A_{MS}A_{LS}\cos(\Delta\omega\Delta t)+2A_{MF}A_{LF}\cos(\Delta\omega\Delta t+\Delta\Phi_B)$$

where $\Delta t = t - t_0$, $\Delta\omega t_0 = \Delta\Phi_S$, $\Delta\Phi_B = \Delta\Phi_S - \Delta\Phi_S$.

Solving for $\Delta\omega t = \Phi_z$ for $H_{total}=0$ (zero crossing point, as illustrated in FIG. 5), yields $$\Phi_z = \tan^{-1}\left(\frac{A_{MS}A_{LS}}{A_{MF}A_{LF}\sin\varphi_B} + \cot\varphi_B\right).$$

The instant temperature sensitivity $dL_z/dT$ in nm/C is found as follows.

Adding $\Delta\omega t_0 - \Delta\Phi_S$ to $\Phi_z$.

$$\Phi'_Z = \tan^{-1}\left(\frac{A_{MS}A_{LS}}{A_{MF}A_{LF}\sin\varphi_B} + \cot\varphi_B\right) + \Delta\varphi_S$$

-continued $$\frac{d\phi'_Z}{dT} = \frac{-1 - \frac{A_{MS}A_{LS}}{A_{MF}A_{LF}}\cos\varphi_B}{\sin^2\varphi_B + \left(\frac{A_{MS}A_{LS}}{A_{MF}A_{LF}} + \cos\varphi_B\right)^2}\frac{d\Delta\varphi_B}{dT} + \frac{d\varphi_S}{dT}$$

where $A_{MS}$, $A_{LS}$, $A_{MF}$, $A_{LF}$ are electric field amplitudes ($A_{MS}$ is amplitude of the measured (M) beam with slow (S) polarization. $A_{LS}$ is amplitude of the local (L) oscillator beam with slow (S) polarization, $A_{MF}$ is amplitude of the measured (M) beam with fast (F) polarization, and $A_{LF}$ is amplitude of the local (L) oscillator beam with fast (F) polarization). Converting phase to distance at zero crossing yields $$\frac{dL_z}{dT} = \frac{\lambda}{2\pi}\frac{d\varphi'_Z}{dT}$$

The net phase (phase due to target minus phase due to reference) is found as follows.

a. Reference Interferometer:

$$\phi_{ZR} = \tan^{-1}\left(\frac{A_{MSR}A_{LSR}}{A_{MFR}A_{LFR}\sin\Delta\phi_{BR}} + \cot\Delta\phi_{BR}\right)$$

-continued $$\Delta\phi_{BR} = \frac{2\pi}{\lambda}(\Delta n_f \Delta d_f + \Delta n_W OPD_R)$$

$$\Delta\phi_{XY} = \frac{2\pi}{\lambda}\left(\sum_M n_{MXY} d_{MY} - \sum_L n_{LXY} d_{LY}\right)$$

M=Measurement path
L=Local Oscillator path
x=S(slow) or F(fast)
Y=R(Reference) or T(Target)
Target Interferometer:

$$\phi_{ZT} = \tan^{-1}\left(\frac{A_{MST} A_{LST}}{A_{MFR} A_{LFR} \sin\Delta\phi_{BR}} + \cot\Delta\phi_{BT}\right)$$

$$\Delta\phi_{BT} = \frac{2\pi}{\lambda}(\Delta n_f \Delta d_f + \Delta n_W OPD_T)$$

$$\Delta\phi_{BT} = \Delta\phi_{ST} - \Delta\phi_{FT}$$

$$\Delta\phi_{BR} = \Delta\phi_{SR} - \Delta\phi_{FR}$$

where $\Delta n_f$ is fiber birefringence and $\Delta n_w$ is waveguide birefringence. Assuming uniform birefringence in the fiber and waveguide, $$\Delta n_f = \Delta n_{fo} + \Delta T_f \frac{d\Delta n_f}{dT}$$

$$\Delta n_W = \Delta n_{Wo} + \Delta T_W \frac{d\Delta n_W}{dT}$$

The net phase is $\Delta\Phi_Z = \Delta\Phi_{ZR} - \Delta\Phi_{ZT}$.

The phase error can be calculated using the above equations and the following parameters:

Average polarization extinction ratio (PER) (e.g., 2-18 dB) for the measurement and local oscillator beams at the mixer.
Polarization Dependent Loss (PDL) between reference and target interferometers (e.g., ~0.15 dB).
OPD (optical path difference) of the reference interferometer (e.g., 1.86 mm).
OPD of the target interferometer (e.g., 8.34 mm).
Optical Path Length between two polarization maintaining input fibers (from 1×2 fiber coupler before AOMs to on chip splitters).
$\Delta n_f$ (e.g., 0.00036).
$\Delta n_w$ (e.g., 0.0001)
$d\Delta n_f/dT$ (e.g., 4.25 e-7/K)
$d\Delta n_w/dT$ (e.g., 4.25 e-7/K).

Using the above example parameters, it was found that for a PER of 3, 10, 15, and 18 dB, the phase change corresponded to a distance error of 235 nm, 43 nm, 13 nm, and 6.5 nm, respectively for temperature fluctuations on the chip of around 250 degrees Celsius.

Using the above example parameters, it was found that for a PER of 3, 10, 15, and 18-18 dB, the phase change corresponded to a distance error of 230 nm, 43 nm, 14 nm, and 7 nm, respectively for temperature fluctuations on the optical fibers of around 25 degrees Celsius.

Process Steps

Figure 7:
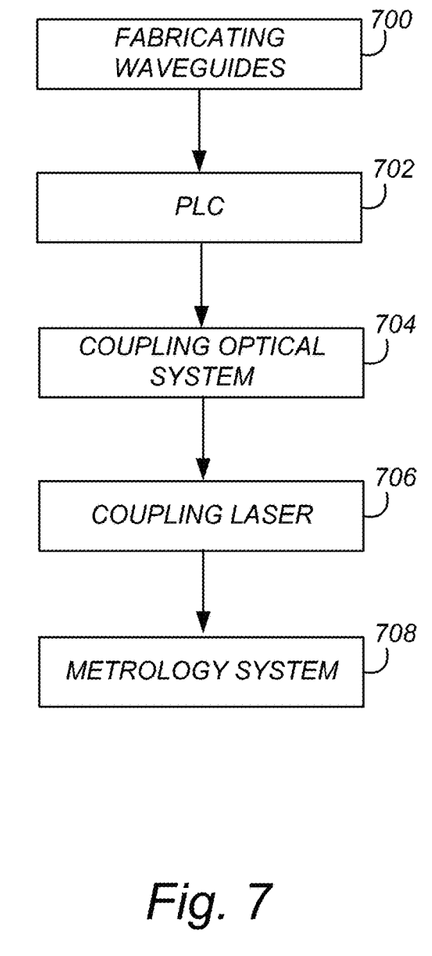
FIG. 7 is a flowchart illustrating a method of fabricating a metrology system, according to one or more examples.

FIG. 7 is a flowchart illustrating a method of fabricating a photonic integrated circuit and/or metrology system.

Block 700 represents defining, fabricating, processing, or providing couplers and waveguides in a chip or substrate (e.g., a semiconductor such a silicon or silica on silicon).

The step includes represents defining, fabricating, or providing:

a first coupler 200 or beamsplitter in a chip 108 or substrate;
a beam launching waveguide 202 in the chip or substrate, wherein the beam launching waveguide 202 is coupled to the first coupler 200 or beamsplitter;
a target waveguide 204, a first local oscillator (LO) waveguide 206, and a second coupler 208 in the chip or substrate, wherein the first coupler 200 couples the target waveguide 204 and the first LO waveguide 206. The target waveguide 204, LO waveguide 206, and second coupler 208 may form a target interferometer;
a reference waveguide 210, a second local oscillator (LO) waveguide 212, and a third coupler 214 in the chip or substrate, wherein the third coupler 214 couples the reference waveguide 210 and the second LO waveguide 212. The reference waveguide 210, the second LO waveguide 212, and third coupler 214 may form a reference interferometer; and
a fourth coupler 216 or beamsplitter in the chip or substrate, wherein the fourth coupler 216 or beamsplitter is coupled to the second LO waveguide 212 and the first LO waveguide 206.

Block 702 represents the end result, a photonic integrated circuit or PLC.

The first coupler 200 splits electromagnetic radiation into target electromagnetic radiation transmitted to the beam launching waveguide 202 and reference electromagnetic radiation transmitted to the reference waveguide.

The fourth coupler splits LO electromagnetic radiation into first LO electromagnetic radiation transmitted to the first LO waveguide 206 and second LO electromagnetic radiation transmitted to the second LO waveguide 212.

The beam launching waveguide 202 transmits the target electromagnetic radiation off the chip/circuit, receives retroreflected electromagnetic radiation comprising a retroreflection of the target electromagnetic radiation from a target off the chip/circuit, and transmits the retroreflected electromagnetic radiation to the target waveguide 204.

The target waveguide 204 transmits a retroreflected field of the retroreflected electromagnetic radiation to the second coupler 208 and the first LO waveguide 206 transmits an LO field of the first LO electromagnetic radiation to the second coupler 208, the retroreflected field interfering with an LO field in the second coupler 208 so as to form a target interference signal 224.

The reference waveguide 210 transmits a reference field of the reference electromagnetic radiation to the third coupler 214 and the second LO waveguide 212 transmits an LO field of the second LO electromagnetic radiation to the third coupler, the reference field interfering with the LO field in the third coupler 214 so as to form reference interference signal 226.

A difference between the reference interference signal 226 and the target interference signal 224 is used to determine a distance D to the target from the photonic integrated circuit PLC. The difference may be measured on photodetectors receiving the interference signals 224, 226.

Block 704 represents optionally electromagnetically coupling the circuit to an optical system 418 so that the optical system (lens 406 and/or Risley prism 402) collimates the target electromagnetic radiation transmitted off the circuit/chip and transmits the target electromagnetic radiation to the target.

Block 706 represents optionally electromagnetically coupling the circuit to an electromagnetic radiation source (e.g., laser) providing the source for the LO and target electromagnetic radiation. Examples of wavelengths for the target and LO electromagnetic radiation include, but are not limited to, ultraviolet wavelengths, infrared wavelengths, visible wavelengths, and/or wavelengths typically used for telecommunications.

Block 708 represents the end result, a metrology system.

The optical path lengths of the waveguides 202, 219, 204, 206, 212, 210 and/or couplers 200, 208, 214, 216 and/or interferometers 124, 128 are selected so as to at least partially compensate for changes in optical path length through the optical system due to thermal variations. For example, optical path lengths of the waveguides 202, 219, 204, 206, 212.210 and/or couplers 200, 208, 214, 216 are selected so that the sum of:

the derivatives of optical path lengths through each of the waveguides 202, 219, 204, 206, 212,210 and/or couplers 200, 208, 214, 216 and/or interferometers 124, 128, with respect to temperature, and the derivative of optical path length through the optical system 418, with respect to temperature, is 0.1 or less.

In one or more examples, a total or sum of the optical path lengths through all the waveguides 202, 219, 204, 206, 212,210 and/or couplers 200, 208, 214, 216 and/or interferometers 124, 128 is in a range of −4 to −10 mm.

In one or more examples, the length of the waveguides 202, 219, 204, 206, 212,210 and/or couplers 200, 208, 214, 216 and/or interferometers 124, 128 is fine tuned such that the difference between the interference signals yields the distance to the target with nanometer resolution.

In one or more examples, the length of the waveguides 202, 219, 204, 206, 212,210 and/or couplers 200, 208, 214, 216 and/or interferometers 124, 128 is such that errors in distance D to the target is under 27.5 nm (root mean square (RMS) for chip housing 138 temperature variations of +/−0.35° C. and a collimator/external optics 418 temperature variation of +/−0.8° C. within 1.5 hours.

Advantages and Improvements

The PLC beam launcher according to one or more embodiments described herein offers many significant advantages such as: (1) higher throughput; (2) lower cost; (3) smaller size. It eliminates custom optical modulators and custom signal processing electronics, offering significant cost savings as compared to an RGM system. In addition, one or more embodiments of the PLC beam launcher improve power efficiency by eliminating high speed electronics, saving power up to ~200 W for the system.

This PLC approach also has the benefit of low cost, since mass production of the PLC chips is readily available from the telecommunications industry.

Applications of the PLC and metrology system examples described herein include, but are not limited to, uses in industry e-beam lithography (stepper laser interferometers) and optical encoders.

REFERENCES

The following references are incorporated by reference herein.

[1] https://ntrs.nasa.gov/archive/nasa/casi.ntrs.nasa.gov/20090011290.pdf

[2] "High performance planar lightwave circuit devices for large capacity transmission", Hiroshi Takahashi, 12 Dec. 2011/Vol. 19, No. 26/OPTICS EXPRESS, http://www.opticsinfobase.org/oe/fulltext.cfm?un=oe-19-26-B173&id=224466.

[3] U.S. Pat. No. 7,003,186.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A photonic integrated circuit, comprising:
a first coupler;
a beam launching waveguide coupled to the first coupler,
a target interferometer including a target waveguide, a first local oscillator (LO) waveguide, and a second coupler coupling the target waveguide and the first LO waveguide;
a reference interferometer including a reference waveguide, a second local oscillator (LO) waveguide, and a third coupler coupling the reference waveguide and the second LO waveguide; and
a fourth coupler coupled to the second LO waveguide and the first LO waveguide;
wherein:
the first coupler splits electromagnetic radiation into target electromagnetic radiation transmitted to the beam launching waveguide and reference electromagnetic radiation transmitted to the reference waveguide;
the fourth coupler splits LO electromagnetic radiation into first LO electromagnetic radiation transmitted to the first LO waveguide and second LO electromagnetic radiation transmitted to the second LO waveguide;
the beam launching waveguide transmits the target electromagnetic radiation comprising a free space beam off the circuit, receives retroreflected electromagnetic radiation comprising a retroreflection of the target electromagnetic radiation from a target off the circuit, and transmits the retroreflected electromagnetic radiation to the target waveguide;
the target waveguide transmits a retroreflected field of the retroreflected electromagnetic radiation to the second coupler and the first LO waveguide transmits an LO field of the first LO electromagnetic radiation to the second coupler, the retroreflected field interfering with the LO field in the second coupler so as to form a target interference signal;
the reference waveguide transmits a reference field of the reference electromagnetic radiation to the third coupler and the second LO waveguide transmits an LO field of the second LO electromagnetic radiation to the third coupler, the reference field interfering with the LO field in the third coupler so as to form a reference interference signal; a difference between the reference interference signal and the target interference signal is used in a metrology system to determine a distance to the target relative to the photonic integrated circuit; and
optical path lengths including a first optical path length of the reference interferometer and a second optical path length of the target interferometer are selected so as to at least partially compensate for changes in a third optical path length through external optics due to thermal variations, the external optics being external to the photonic integrated circuit and comprising a lens collimating the free space beam transmitted off the circuit and transmitting the free space beam to the target.

2. The circuit of claim 1, wherein the optical path lengths of the waveguides are selected so as to minimize sensitivity of the difference to the thermal variations.

3. A metrology system comprising a single fiducial and including the circuit of claim 1, further comprising:
the external optics electromagnetically coupled to the circuit so as to:
transmit the free space beam comprising the only beam transmitted from the beam launching waveguide to the target comprising the single fiducial, and
transmit the retroreflected electromagnetic radiation to the beam launching waveguide.

4. The system of claim 3, wherein the optical path lengths of the waveguides are selected so that a sum of:
the derivatives of the optical path lengths through each of the waveguides, with respect to temperature, and
the derivative of the third optical path length through the external optics, with respect to temperature, is 0.1 or less.

5. The circuit of claim 1, wherein a sum of all the optical path lengths through all the waveguides is in a range of 4-10 mm shorter than the third optical path length through the external optics.

6. The circuit of claim 1, wherein the optical path lengths are selected so that the difference is used to obtain the distance to the target with nanometer resolution.

7. The circuit of claim 1, wherein the waveguides and couplers are fabricated in a silica on silicon chip and the external optics includes a prism.

8. A method of fabricating a photonic integrated circuit, comprising:
in a chip, providing:
a first coupler;
a beam launching waveguide coupled to the first coupler;
a target interferometer including a target waveguide, a first local oscillator (LO) waveguide, and a second coupler coupling the target waveguide and the first LO waveguide;
a reference interferometer including a reference waveguide, a second local oscillator (LO) waveguide, and a third coupler coupling the reference waveguide and the second LO waveguide; and
a fourth coupler coupled to the second LO waveguide and the first LO waveguide;
wherein:
the first coupler splits electromagnetic radiation into target electromagnetic radiation transmitted to the beam launching waveguide and reference electromagnetic radiation transmitted to the reference waveguide;
the fourth coupler splits LO electromagnetic radiation into first LO electromagnetic radiation transmitted to the first LO waveguide and second LO electromagnetic radiation transmitted to the second LO waveguide;
the beam launching waveguide transmits the target electromagnetic radiation comprising a free space beam off the circuit, receives retroreflected electromagnetic radiation comprising a retroreflection of the target electromagnetic radiation from a target off the circuit, and transmits the retroreflected electromagnetic radiation to the target waveguide;
the target waveguide transmits a retroreflected field of the retroreflected electromagnetic radiation to the second coupler and the first LO waveguide transmits an LO field of the first LO electromagnetic radiation to the second coupler, the retroreflected field interfering with the LO field in the second coupler so as to form a target interference signal;
the reference waveguide transmits a reference field of the reference electromagnetic radiation to the third coupler and the second LO waveguide transmits an LO field of the second LO electromagnetic radiation to the third coupler, the reference field interfering with the LO field in the third coupler so as to form reference interference signal;
a difference between the reference interference signal and the target interference signal is used a metrology system to determine a distance to the target relative to the photonic integrated circuit; and
optical path lengths including a first optical path length of the reference interferometer and a second optical path length of the target interferometer are selected so as to at least partially compensate for changes in a third optical path length through external optics due to thermal variations, the external optics being external to the photonic integrated circuit and comprising a lens collimating the free space beam transmitted off the circuit and transmitting the free space beam to the target.

9. The method of claim 8, further comprising selecting the optical path lengths of the waveguides so as to minimize sensitivity of the difference to the thermal variations.

10. The method of claim 8, further comprising:
providing a metrology system comprising a single fiducial and the external optics electromagnetically coupled to the circuit so as to:
transmit the free space beam comprising the only beam transmitted from the beam launching waveguide to the target comprising the single fiducial, and
transmit the retroreflected electromagnetic radiation to the beam launching waveguide.

11. The method of claim 10, further comprising selecting the optical path lengths of the waveguides so that the sum of:
the derivatives of optical path lengths through each of the waveguides, with respect to temperature, and
the derivative of the third optical path length through the external optics, with respect to temperature,
is 0.1 or less.

12. The method of claim 8, wherein a sum of the optical path lengths through all the waveguides is in a range of 4-10 millimeters (mm) shorter than the optical path length through the external optics.

13. The method of claim 8, wherein the optical path lengths are selected so that the difference is used to obtain the distance to the target with nanometer resolution.

14. The method of claim 8, wherein the waveguides and couplers are fabricated in a silica on silicon chip.

15. A photonic integrated circuit on a chip, comprising:
a beam launching waveguide;
a local oscillator waveguide;
a target interferometer coupled to the beam launching waveguide and the local oscillator waveguide, and
a reference interferometer coupled to the local oscillator waveguide, wherein:
the beam launching waveguide transmits target electromagnetic radiation comprising a free space beam off the chip and receives a retroreflection of the target electromagnetic radiation from the target;

the target interferometer interferes the retroreflection with a local oscillator field transmitted from the local oscillator waveguide so as to form a target interference signal;

the reference interferometer interferes a portion of the target electromagnetic radiation that does not leave the chip with the local oscillator field transmitted from the local oscillator waveguide to form a reference interference signal;

a difference between the reference interference signal and the target interference signal is used to measure a distance to the target from the chip; and optical path lengths including a first optical path length of the reference interferometer and a second optical path length of the target interferometer are selected so as to at least partially compensate for changes in a third optical path length through external optics due to thermal variations, the external optics being external to the photonic integrated circuit and collimating the free space beam transmitted off the circuit and transmitting the free space beam to the target.

16. The circuit of claim 15, wherein the optical path lengths of the waveguides are selected so as to minimize sensitivity of the difference to the thermal variations.

17. The circuit of claim 15, wherein the optical path lengths are selected so that the difference is used to obtain the distance to the target with nanometer resolution.

18. A metrology system including the circuit of claim 15, further comprising:

the chip including the circuit;

the external optics off the chip and electromagnetically coupled to the circuit, the external optics including a lens and/or a prism.

19. The circuit of claim 15, wherein the optical path lengths of the waveguides are selected so that a sum of:

the derivatives of the optical path lengths through each of the waveguides, with respect to temperature, and the derivative of the third optical path length through the external optics, with respect to temperature, is 0.1 or less.

20. The circuit of claim 15, wherein a sum of all the optical path lengths through all the waveguides is in a range of 4-10 millimeters (mm) shorter than the optical path length through the external optics.

* * * * *